US010867755B2

(12) United States Patent
You et al.

(10) Patent No.: US 10,867,755 B2
(45) Date of Patent: Dec. 15, 2020

(54) METHOD FOR MANUFACTURING CAPACITIVE DEIONIZATION ELECTRODE AND CAPACITIVE DEIONIZATION ELECTRODE MANUFACTURED USING THE SAME

(71) Applicant: DOOSAN HEAVY INDUSTRIES & CONSTRUCTION CO., LTD., Changwon-si (KR)

(72) Inventors: Jang Yong You, Gyeonggi-do (KR); Seok Ho Choi, Anyang-si (KR); Hyun Sung Choi, Busan (KR); Han Joo Kim, Cheongju-si (KR); Dong Ju Lee, Gongju-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 0 days.

(21) Appl. No.: 16/103,850

(22) Filed: Aug. 14, 2018

(65) Prior Publication Data

US 2019/0066936 A1 Feb. 28, 2019

(30) Foreign Application Priority Data

Aug. 29, 2017 (KR) .......................... 10-2017-0109559

(51) Int. Cl.
| | |
|---|---|
| H01G 11/86 | (2013.01) |
| C02F 1/461 | (2006.01) |
| C02F 1/469 | (2006.01) |
| H01G 11/40 | (2013.01) |
| H01G 11/36 | (2013.01) |
| H01G 11/34 | (2013.01) |
| H01G 11/38 | (2013.01) |
| H01G 11/24 | (2013.01) |

(52) U.S. Cl.
CPC .......... *H01G 11/86* (2013.01); *C02F 1/4691* (2013.01); *C02F 1/46109* (2013.01); *H01G 11/34* (2013.01); *H01G 11/36* (2013.01); *H01G 11/40* (2013.01); *H01G 11/24* (2013.01); *H01G 11/38* (2013.01)

(58) Field of Classification Search
None
See application file for complete search history.

(56) References Cited

U.S. PATENT DOCUMENTS

| | | | | |
|---|---|---|---|---|
| 2002/0167782 A1* | 11/2002 | Andelnnan | ............. | C02F 1/008 361/302 |
| 2010/0328841 A1* | 12/2010 | Reinhoudt | .......... | C02F 1/46109 361/301.4 |
| 2014/0202880 A1* | 7/2014 | Suss | ......................... | B03C 9/00 205/758 |
| 2016/0289097 A1* | 10/2016 | Jeong | .................... | C02F 1/4691 |

FOREIGN PATENT DOCUMENTS

| | | | | | |
|---|---|---|---|---|---|
| CN | 104916458 | A | * | 9/2015 | |
| EP | 2338843 | A1 | | 6/2011 | |
| KR | 10-1353915 | B1 | | 1/2014 | |
| KR | 10-2015-0019712 | A | | 2/2015 | |
| KR | 10-2016-0062765 | A | | 6/2016 | |
| KR | 20190023586 | A | | 3/2019 | |
| WO | 2015/005250 | A1 | | 1/2015 | |
| WO | WO-2015005250 | A1 | * | 1/2015 | ............ C02F 1/4691 |

OTHER PUBLICATIONS

Porada et al. "Carbon flow electrodes for continuous operation of capacitive deionization and capacitive mixing energy generation". J. Mater. Chem. A, 2014, 2, 9313 (hereafter "Porada") (Year: 2014).*
A Korean Office Action dated Apr. 3, 2019 in connection with Korean Patent Application No. 10-2019-0032460 which corresponds to the above-referenced U.S. application.
An European Search Report dated Oct. 18, 2018 in connection with European Patent Application No. 18188818.1 which corresponds to the above-referenced U.S. application.
Korean Office Action issued by the Korean Intellectual Property Office dated Jul. 5, 2018 in connection with Korean patent Application No. 10-2017-0109559.

* cited by examiner

*Primary Examiner* — Jose I Hernandez-Kenney
(74) *Attorney, Agent, or Firm* — Invenstone Patent, LLC (57) ABSTRACT

A method for manufacturing a capacitive deionization electrode exhibits enhanced ionic material adsorption efficiency. The method includes (a) kneading an electrode active material while adding a solvent to the electrode active material; (b) adding a solvent to the mixture obtained after (a) and stirring the result; and (c) preparing an electrode slurry by adding a binder to the mixture obtained after (b) and stirring the result. According to the method, a problem of a binder blocking electrode pores, which used to occur when using existing methods, is resolved by increasing mixing efficiency of the binder while using an electrode active material having a high specific surface area. A capacitive deionization electrode having very superior ionic material adsorption efficiency may be manufactured using the method.

15 Claims, 9 Drawing Sheets

ELECTRODE CRACKS     ELECTRODE DETACHMENT        PARTICLE DERIVATION
<COMPARATIVE EXAMPLE 2>                         <COMPARATIVE EXAMPLE 3>

NORMAL ELECTRODE
<EXAMPLE 6>

[FIG. 9]

METHOD FOR MANUFACTURING CAPACITIVE DEIONIZATION ELECTRODE AND CAPACITIVE DEIONIZATION ELECTRODE MANUFACTURED USING THE SAME

CROSS-REFERENCE TO RELATED APPLICATIONS

This application claims priority to Korean Patent Application No. 10-2017-0109559, filed on Aug. 29, 2017, the disclosure of which is incorporated herein by reference in its entirety.

BACKGROUND OF THE INVENTION

Field of the Invention

The present disclosure relates to a method for manufacturing a capacitive deionization electrode having enhanced ionic material adsorption efficiency, and a capacitive deionization electrode having enhanced ionic material adsorption efficiency manufactured using the method.

Description of the Related Art

Capacitive deionization (CDI) is a technology for removing ionic materials in raw water using an ion adsorption and desorption reaction in an electric double layer (EDL) formed at a charged electrode interface.

Figure 1:
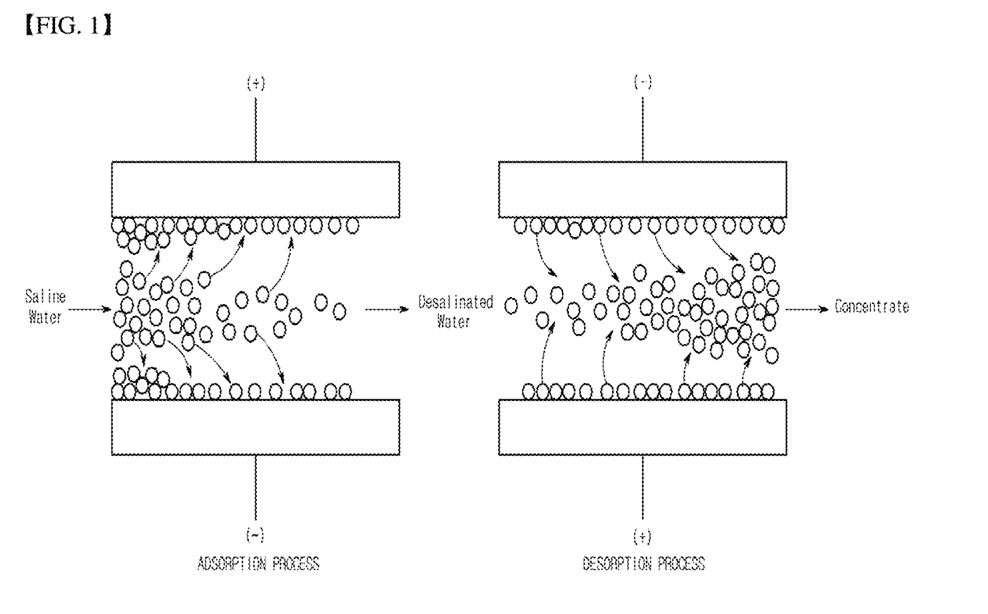
FIG. 1 is a diagram for explaining a principle of capacitive deionization.

FIG. 1 is an explanatory view presenting a principle of capacitive deionization technology, and illustrates a process of adsorption and desorption of ions on a charged electrode surface. When describing the adsorption and desorption process with reference to FIG. 1, an electrode is charged by a certain amount by applying a voltage within a potential range such that no electrolysis reaction of water occurs. When passing ion—including saline water (brine water) through the charged electrode, ions having an opposite charge to the charged electrode migrate to each electrode by an electrostatic force and are adsorbed into the electrode surface, and water passing through the electrode becomes pure water with ions being removed (desalinated water).

Here, the amount of ions adsorbed by the electrode is determined by the capacitance of the electrode used, and therefore, a porous carbon electrode having a large specific surface area is generally used as the electrode used for CDI.

Meanwhile, when the adsorption capacity of the electrode is saturated, no further ions are adsorbed, and ions in the influent emerge directly as an effluent. Here, when shorting the electrode or applying potential opposite to the adsorption potential to the electrode to desorb the ions adsorbed to the electrode, the electrode loses charge or becomes to have an opposite charge, and adsorbed ions are rapidly desorbed to regenerate the electrode.

As described above, CDI technology is very simple in the process operation since adsorption and desorption occur just by changing electrode potential, and is known as an environmental-friendly deionization process since environmental pollutants are not discharged during the deionization process. In addition, as another example, selectivity of adsorbed ions may increase by forming an ion exchange membrane on the electrode surface.

Although active carbon that has been used in existing CDI electrodes is low in costs and readily supplied as a coconut shell-based, it has a relatively high impurity content and has a low specific surface area vulnerable to durability of the electrode, and also has a problem of an organic binder and an organic solvent used during the manufacture being eluted to production water.

In view of the above, attempts to manufacture an electrode using active carbon having a high specific surface area have been recently made. However, due to the nature of active carbon powder having a high specific surface area, particles aggregate and form aggregates like a bunch of grapes in this case. When manufacturing an electrode using existing general methods, a binder fails to enter between particles in the aggregate and instead enters empty pores between the aggregates, thus blocking the pores, which generates a new problem of significantly decreasing adsorption efficiency.

SUMMARY OF THE INVENTION

The present disclosure has been made in view of the above, and one embodiment of the present disclosure is directed to providing a method for manufacturing a capacitive deionization electrode having excellent ionic material adsorption efficiency.

Another embodiment of the present disclosure is directed to providing a capacitive deionization electrode having excellent ionic material adsorption efficiency manufactured using the method.

However, objects and advantages of the present disclosure are not limited to objects and advantages mentioned above, and other objects and advantages that are not mentioned will be clearly understood to those skilled in the art from the descriptions provided below.

One embodiment of the present disclosure relates to a method for manufacturing a capacitive deionization electrode including (a) kneading an electrode active material while adding a solvent to the electrode active material; (b) adding a solvent to the mixture obtained after (a) and stirring the result; and (c) preparing an electrode slurry by adding a binder to the mixture obtained after (b) and stirring the result.

The electrode active material may include one of an active carbon powder, an active carbon fiber, a carbon nanotube, a carbon aerogel, and a mixture thereof.

The electrode active material may have a specific surface area of at least 1900 $m^2/g$.

The electrode active material has an average particle diameter of not more than 10 μm.

The electrode active material may be included in an amount of 20% by weight to 40% by weight with respect to a total weight of the electrode slurry.

The solvent of (a) may include an aqueous solvent.

The solvent of (a) may be added in an amount of 10% by weight to 15% by weight with respect to a total weight of the electrode slurry.

The solvent of (a) may be added to the electrode active material in divided portions of 2 to 20 times.

The kneading may be carried out for 20 minutes to 6 hours.

The solvent of (b) may be added in an amount of 30% by weight to 45% by weight with respect to a total weight of the electrode slurry.

Step (b) may include adding one or more types of additives selected from the group consisting of a conductor, a dispersant, and a viscosity agent. The conductor may be selected from the group consisting of graphene, acetylene black, ketjen black, XCF carbon, SRF carbon, conducting polymer powders, and inorganic salts. The dispersant may be selected from the group consisting of triethanolamine oleate, sodium oleate, potassium oleate, N-cetyl-N-ethylmorpholinium sulphate, oleic acid, sorbitan trioleate, and sorbitan monolaurate. The viscosity agent may be selected from the group consisting of polyvinyl alcohol, polyacrylate, hydroxypropyl methyl cellulose and carboxymethyl cellulose. The additive may be added in an amount of greater than 0% by weight and less than or equal to 10% by weight with respect to a total weight of the electrode slurry.

The binder may include an aqueous binder. The binder may be one or more types selected from the group consisting of styrene butadiene rubber (SBR), polyvinylpyrrolidone (PVP) and polytetrafluoroethylene (PTFE).

The binder may be added in an amount of 5% by weight to 15% by weight with respect to a total weight of the electrode slurry.

Step (c) may be carried out by adding a first binder to the mixture obtained after (b) and stirring the result, and then adding a second binder thereto and stirring the result.

The first binder may be one or more types among styrene butadiene rubber and polyvinylpyrrolidone, and the second binder is polytetrafluoroethylene.

The method may further include manufacturing an electrode by laminating the electrode slurry obtained in (c) on a current collector, and the current collector may have a form of a sheet, a thin film or a plain woven wire mesh including aluminum, nickel, copper, titanium, iron, stainless steel, graphite or mixtures thereof.

Another embodiment of the present disclosure relates to a capacitive deionization electrode manufactured using the method of the present disclosure.

Still another embodiment of the present disclosure relates to a cell for capacitive deionization including the capacitive deionization electrode of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, preferred embodiments of the present disclosure will be described. However, embodiments of the present disclosure may be modified to various different forms, and the scope of the present disclosure is not limited to the embodiments described below. In addition, embodiments of the present disclosure are provided to those having average knowledge in the art for more fully describing the present disclosure.

Existing methods for manufacturing a capacitive deionization electrode are based on adding an organic binder, an organic solvent and other additives (dispersant, viscosity agent and the like) to an electrode active material without order and simply stirring the result.

Figure 2:
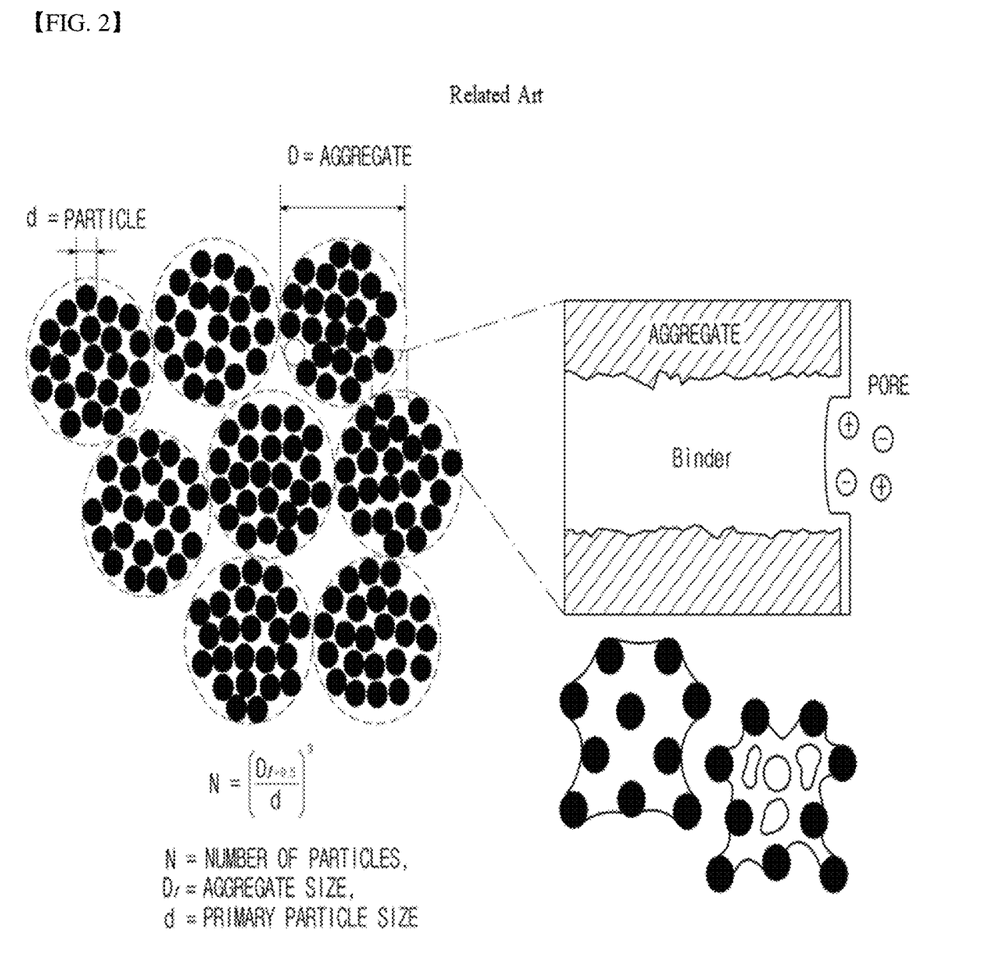
FIG. 2 is a diagram of electrode active material aggregates and pores when using an existing method for manufacturing a capacitive deionization electrode.

However, when using an electrode active material powder form with a high specific surface area of approximately 1900 $m^2/g$ or greater as the electrode active material, electrode active material particles having a high specific surface area form aggregates like a bunch of grapes as in FIG. 2. Here, a binder fails to enter between the particles and only enters into empty space between the aggregates blocking pores, which causes a problem of significantly decreasing adsorption efficiency.

In view of the above, inventors of the present disclosure have developed a method for manufacturing an electrode having significantly superior ionic material adsorption efficiency without a problem of a binder blocking electrode pores, by increasing mixing efficiency with the binder, while using active carbon having a high specific surface area.

One embodiment of the present disclosure relates to a method for manufacturing a capacitive deionization electrode including (a) kneading an electrode active material while adding a solvent to the electrode active material; (b) adding a solvent to the mixture obtained after (a) and stirring the result; and (c) preparing an electrode slurry by adding a binder to the mixture obtained after (b) and stirring the result.

The present disclosure is different from existing manufacturing methods in that, instead of using a process of adding a binder and a solvent to an electrode active material in one step and stirring the result, a three-step process is carried out, namely, kneading while mixing a solvent to an electrode active material in small quantities, then stirring while adding other additives such as a solvent and a viscosity agent to the obtained mixture, and then adding a binder.

Figure 3:
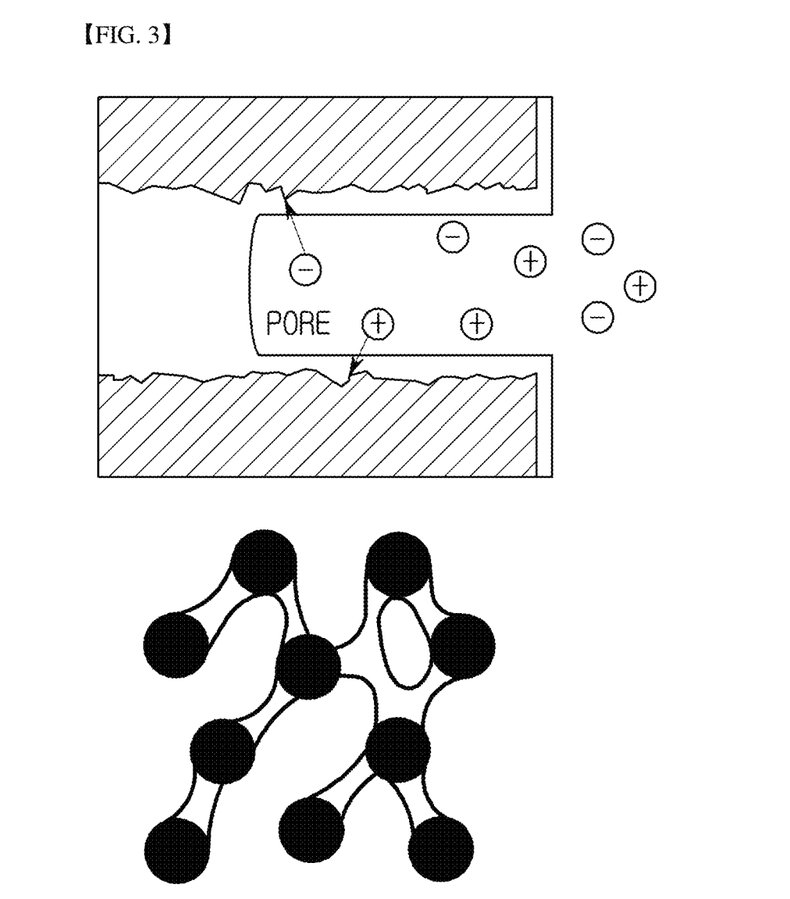
FIG. 3 is a diagram of electrode active material aggregates and pores when using a method for manufacturing a capacitive deionization electrode of the present disclosure.

In the present disclosure, by carrying out a kneading process while adding a small amount of a solvent to an electrode active material in divided portions, the solvent may coat the periphery of an aggregate that the electrode active material forms to a minimum thickness, and by further adding a binder and a solvent to the dough mixture obtained thereafter and stirring the result, the binder penetrates between particles inside the aggregate, and as illustrated in FIG. 3, ionic material adsorption efficiency may be significantly enhanced by widening a pore area of the electrode while increasing a binding effect of the aggregate.

Step (a)

In the present disclosure, step (a) of kneading while adding a solvent to an electrode active material may be carried out as above.

In addition, in the present disclosure, the electrode active material is an active carbon-based material, and an active carbon powder, an active carbon fiber, a carbon nanotube, a carbon aerogel or a mixture thereof may be used. However, preparing the electrode active material into a powder is preferred, and more preferably, an active carbon powder may be used.

For the purpose of the present disclosure, the electrode active material may have a specific surface area of 1900 $m^2/g$ or greater.

In addition, in the present disclosure, the electrode active material having an average particle diameter of 10 μm or less and preferably 7.5 μm to 8.5 μm may increase a specific surface area and increase capacitance capacity of the electrode. However, the average particle diameter is not limited to this.

In the present disclosure, the electrode active material is preferably included in an amount of 20% by weight to 40% by weight with respect to a total weight of the electrode slurry. When the amount of the electrode active material is less than 20% by weight, a sufficient deionization effect may not be obtained, and when the amount of the electrode active material is greater than 40% by weight, an electrode slurry having target properties may not be prepared as amounts of the binder, the solvent, and the other additives decrease.

In addition, by using an aqueous solvent as the solvent added in the step (a) in the present disclosure for the purpose of the present disclosure, a problem of an organic solvent being eluted to production water when operating using an electrode to be manufactured later may be resolved. Here, specific types of the aqueous solvent are not particularly limited, but the aqueous solvent may preferably be water.

In the present disclosure, a process of kneading while adding a solvent to an electrode active material may be carried out as above.

In the present disclosure, the solvent is preferably added in an amount of 10% by weight to 15% by weight with respect to a total weight of the electrode slurry in the step (a). When the amount of the solvent added in the kneading process is less than 10% by weight, pores may not be sufficiently formed since the solvent does not sufficiently coat the periphery of an aggregate that the electrode active material forms, and when the solvent amount is greater than 15% by weight, the solvent penetrates between the particles, and a viscosity agent, a binder or the like to be added later may be dissolved in the solvent and block the pores.

In the present disclosure, the solvent may be added once to the electrode active material for kneading in the step (a), but preferably, a method of adding the solvent in several divided portions may be used. Specifically, carrying out a process of dividing the solvent to be added into portions of several times, for example, 2 to 20 times, and then kneading continuously while intermittently adding the solvent in 2 to 20 times during the process of kneading the electrode active material is preferred since mixing efficiency between the solvent and a binder to be added may increase between the electrode active material particles while minimizing the amount of the solvent surrounding the aggregate.

In the present disclosure, the kneading process is a process of adding a solvent to an electrode active material or a mixture in which additives are added to an electrode active material, and then kneading by applying force using a method of pressing, folding or stretching, and may be carried out using, for example, a kneader.

In the present disclosure, the kneading process may be carried out for 20 minutes to 6 hours, and preferably for 30 minutes to 2 hours. In the present disclosure, when the kneading process is carried out for less than 20 minutes, the amount of the binder surrounding the periphery of the aggregate increases blocking the pores, and ionic material adsorption efficiency may decrease, and when the kneading is carried out for longer than 6 hours, further improvement effects are difficult to expect, which may cause a problem from an economic point of view.

Step (b)

In the present disclosure, step (b) of adding a solvent to the dough mixture obtained by the kneading process and stirring the result may be carried out after the step (a).

In the step (b) of the present disclosure, the solvent is preferably added in an amount of 30% by weight to 45% by weight with respect to a total weight of the electrode slurry. In the present disclosure, when the solvent is added in an amount of less than 30% by weight, the solvent may not be sufficiently mixed between the electrode active material particles, and when the solvent is added in an amount of greater than 45% by weight, the amount of the solvent remaining around the aggregate that the electrode active material forms becomes excessive, and a viscosity agent, a binder or the like to be added later may be dissolved in the remaining solvent part blocking the pores.

In the present disclosure, in the step (b), a step of further adding one or more additives selected from the group consisting of a conductor, a dispersant and a viscosity agent together with the solvent may be further included, and preferably, a viscosity agent may be essentially added.

In the present disclosure, the conductor enables electric connection between particles of the electrode active material, and between the active material particle and a current collector through a point contact, and the conductor is not limited in the present disclosure as long as it is a conducting material having low electric resistance, which is, for example, any one or more components selected from among graphene, acetylene black, ketjen black, XCF carbon, SRF carbon, conducting polymer powders, inorganic salts (LiCl, NaCl, KCl and the like) and the like.

In the present disclosure, the content range of the conductor may be adjusted depending on required properties. More specifically, although not limited thereto, those having an average particle diameter of 10 μm or less and preferably 10 nm to 10 μm are preferred in increasing electrical conductivity of the electrode.

In the present disclosure, the dispersant is for uniformly mixing the electrode active material and a binder to be added later in the solvent in the steps (a) to (c), and although the types are not particularly limited, examples thereof may include one or more types among anionic surfactants such as triethanolamine oleate, sodium oleate or potassium oleate, cationic surfactants such as N-cetyl-N-ethylmorpholinium sulphate, and nonionic surfactants such as oleic acid, sorbitan trioleate or sorbitan monolaurate.

In the present disclosure, the viscosity agent is for uniform dispersion by lowering viscosity in a dispersion process, and at the same time, for preventing a decrease in the electrode strength by restoring viscosity after the dispersion, and although the types are not particularly limited, examples thereof may include one or more types selected from the group consisting of polyvinyl alcohol, polyacrylate, hydroxypropyl methyl cellulose and carboxymethyl cellulose.

In the present disclosure, the additive may be preferably added in greater than 0% by weight and less than or equal to 10% by weight with respect to a total weight of the electrode slurry prepared in the step (b) in terms of enhancing electrical conductivity and capacitance capacity of the electrode, and obtaining target dispersion and viscosity increasing effects.

Step (c)

In the present disclosure, step (c) of preparing an electrode slurry by adding a binder to the mixture obtained after the step (b) and stirring the result may be carried out.

In the present disclosure, the step (c) may be preferably carried out in two steps of adding a first binder to the mixture obtained after the step (b) and stirring the result, and then adding a second binder thereto and stirring the result.

In the present disclosure, by using an aqueous binder as the binder for the purpose of the present disclosure, a problem of an organic solvent being eluted to production water when operating using an electrode manufactured later may be resolved. Here, specific types of the aqueous binder are not particularly limited, however, the aqueous binder may be preferably one or more types selected from the group consisting of styrene butadiene rubber (SBR), polyvinylpyrrolidone (PVP) and polytetrafluoroethylene (PTFE). Preferably, the first binder may be one or more types among styrene butadiene rubber and polyvinylpyrrolidone, and the second binder may be polytetrafluoroethylene.

In the present disclosure, the binder is preferably added in an amount of 5% by weight to 15% by weight with respect to a total weight of the electrode slurry. When the binder is added in an amount of less than 5% by weight in the present disclosure, the binder is not sufficiently mixed between the electrode active material particles failing to form sufficient pores and deionization efficiency may decrease, and when the binder is added in an amount of greater than 15% by weight, the amount of the binder remaining around the aggregate that the electrode active material forms becomes excessive blocking the pores, which may decrease deionization efficiency.

In the present disclosure, a step of preparing an electrode by laminating the electrode slurry obtained after carrying out the step (c) on a current collector may be carried out.

In the present disclosure, as the current collector, those having excellent conductivity are preferably used so that, when a current is supplied to the manufactured electrode through a power supply device, the electric field is evenly distributed on the electrode surface. Such examples thereof may include a form of a sheet, a thin film or a plain woven wire mesh including aluminum, nickel, copper, titanium, iron, stainless steel, graphite or mixtures thereof, but are not limited thereto.

In addition, in the present disclosure, the lamination method is not limited and may be carried out by spray, dip coating, tape casting, knife casting, doctor blade or spin coating, and employing a lamination thickness in a range of 50 µm to 300 µm is preferred in increasing deionization efficiency while decreasing electric resistance of the electrode. In addition, as necessary, an electrode having a specific thickness intended to manufacture may be manufactured by repeating the step of laminating the electrode slurry on a current collector one or more times.

According to the method for manufacturing a capacitive deionization electrode provided in the present disclosure, a problem of a binder blocking electrode pores, which used to occur when using existing methods, is resolved by increasing mixing efficiency of the binder while using an electrode active material having a high specific surface area, and a capacitive deionization electrode having exceptionally superior ionic material adsorption efficiency may be manufactured.

In addition, the present disclosure uses an aqueous binder as the binder and does not use an organic solvent as the solvent when manufacturing the capacitive deionization electrode, and therefore, a problem of an organic solvent being eluted to production water obtained after operating the electrode does not occur.

Another embodiment of the present disclosure provides a membrane-electrode assembly for capacitive deionization including the capacitive deionization electrode manufactured according to the present disclosure.

In the present disclosure, the membrane-electrode assembly for capacitive deionization includes an anode electrode, a cathode electrode positioned opposite to the anode electrode, and an ion exchange membrane positioned between the anode electrode and the cathode electrode, and the capacitive deionization electrode may be employed as the anode electrode or the cathode electrode.

In addition, according to still another embodiment of the present disclosure, a cell for capacitive deionization including the membrane-electrode assembly for capacitive deionization according to the present disclosure may be manufactured.

Hereinafter, the present disclosure will be more specifically described with reference to specific examples. The following examples are for illustrative purposes only provided for illuminating the present disclosure, and the scope of the present disclosure is not limited thereto.

EXAMPLE

Examples 1 to 6

Manufacture of Electrode for Capacitive Deionization

Figure 4:
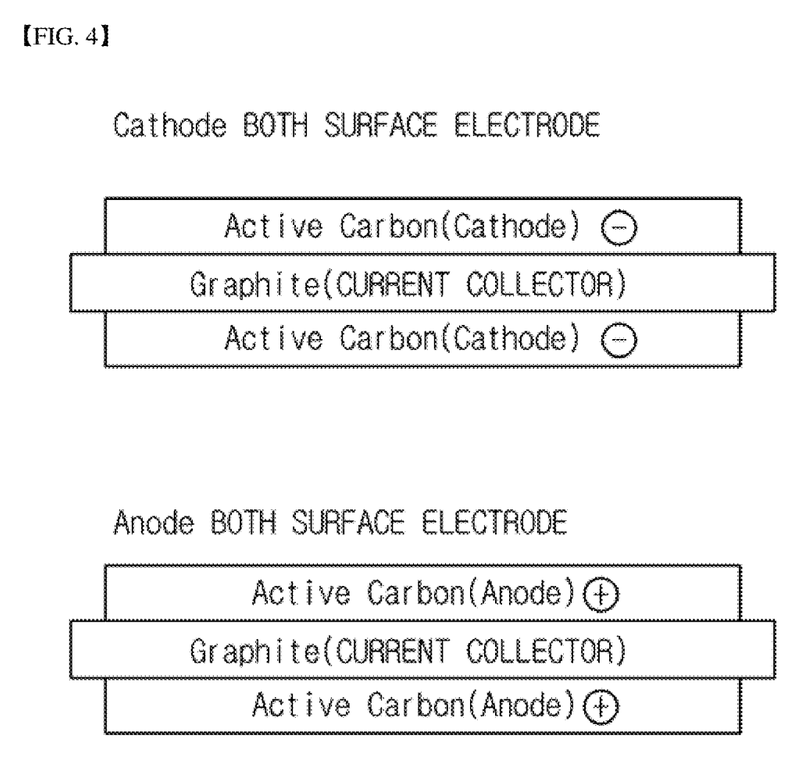
FIG. 4 is a diagram of the sectional structures of cathode and anode electrodes to be used in an experiment of Experimental Example 1 of the present disclosure.

After preparing 10 g of an electrode active material under the condition listed in the following Table 1, the material was continuously kneaded for 30 minutes using a kneader while adding 3.75 g of water (solvent) thereto under the condition listed in the following Table 2. After that, the obtained dough mixture was stirred while adding 11.25 g of water (solvent), 1 g of carbon black (conductor), and 1 g of carboxymethyl cellulose (viscosity agent) thereto. After that, 2 g of a mixture of styrene butadiene rubber (first binder) and polyvinylpyrrolidone (first binder) was added thereto, the result was stirred, and then 1 g of polytetrafluoroethylene (second binder) was added thereto, and the result was stirred to prepare an electrode slurry. Using a tape casting method, the electrode slurry prepared as above was laminated on both surfaces of a graphite current collector to manufacture an electrode having a structure illustrated in FIG. 4.

TABLE 1

| Category | Preparation Example 1 | Preparation Example 2 |
|---|---|---|
| Active Carbon Material | ACS20 | CEP21KS |
| Manufacturer | CHINA STEEL | POWER CARBON |
| PSA (µm) | D50: 7.8 | D50: 8.0 |
| BET (m$^2$/g) | 1914 ± 5 | 1930 ± 4 |

TABLE 2

| Category | Example 1 | Example 2 | Example 3 | Example 4 | Example 5 | Example 6 |
|---|---|---|---|---|---|---|
| Electrode | Preparation Example 1 | Preparation Example 1 | Preparation Example 1 | Preparation Example 2 | Preparation Example 2 | Preparation Example 2 |
| Active Material | 10 g | 10 g | 10 g | 10 g | 10 g | 10 g |
| Step (a)-Water | 3.75 g | 3.75 g | 3.75 g | 3.75 g | 3.75 g | 3.75 g |
| Step (b)-Water | 11.25 g | 11.25 g | 11.25 g | 11.25 g | 11.25 g | 11.25 g |
| Step (b)-CMC | 1 g | 1 g | 0.5 g | 1 g | 1 g | 0.5 g |
| Step (b)-Carbon Black | 1 g | 0.5 g | 0.5 g | 1 g | 0.5 g | 0.5 g |
| Step (C)-SBR + PVP | 2 g | 2 g | 2 g | 2 g | 2 g | 2 g |
| Step (C)-PTFE | 1 g | 1.5 g | 2 g | 1 g | 1.5 g | 2 g |

Comparative Example 1

Manufacture of Electrode for Capacitive Deionization

Using an electrode active material under the condition listed in the following Table 3, components under the same condition as in Example 1 were simply mixed in one step and stirred to manufacture an electrode.

TABLE 3

| Category | Preparation Example 3 |
|---|---|
| Active Carbon Material | P60U |
| Manufacturer | KURARAY |
| PSA (μm) | D50: 7.4 |
| BET (m$^2$/g) | 1820 ± 3 |

Experimental Example 1

Measurement of Deionization Capacity and Electrical Conductivity

Figure 5:
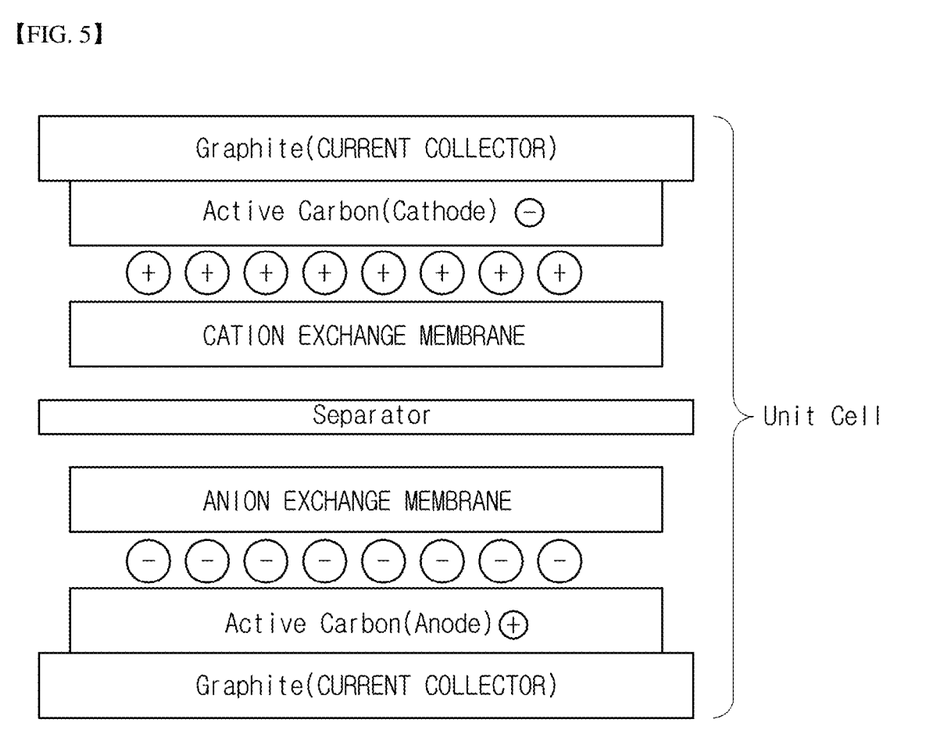
FIG. 5 is a diagram illustrating a sectional structure of a single cell for capacitive deionization to be used in an experiment of Experimental Example 1 of the present disclosure.

A deionization cell was manufactured using each of the electrodes manufactured in Examples 1 to 6 and Comparative Example 1 as a cathode and an anode. Specifically, the electrode manufactured as illustrated in FIG. 5 was cut into 10 cm$^2$×10 cm$^2$, a separator was provided between the cathode and the anode, and then a cation exchange membrane and an anion exchange membrane were further provided between the separator and the cathode, and between the separator and the anode, respectively, to constitute a single cell for capacitive deionization.

Figure 6:
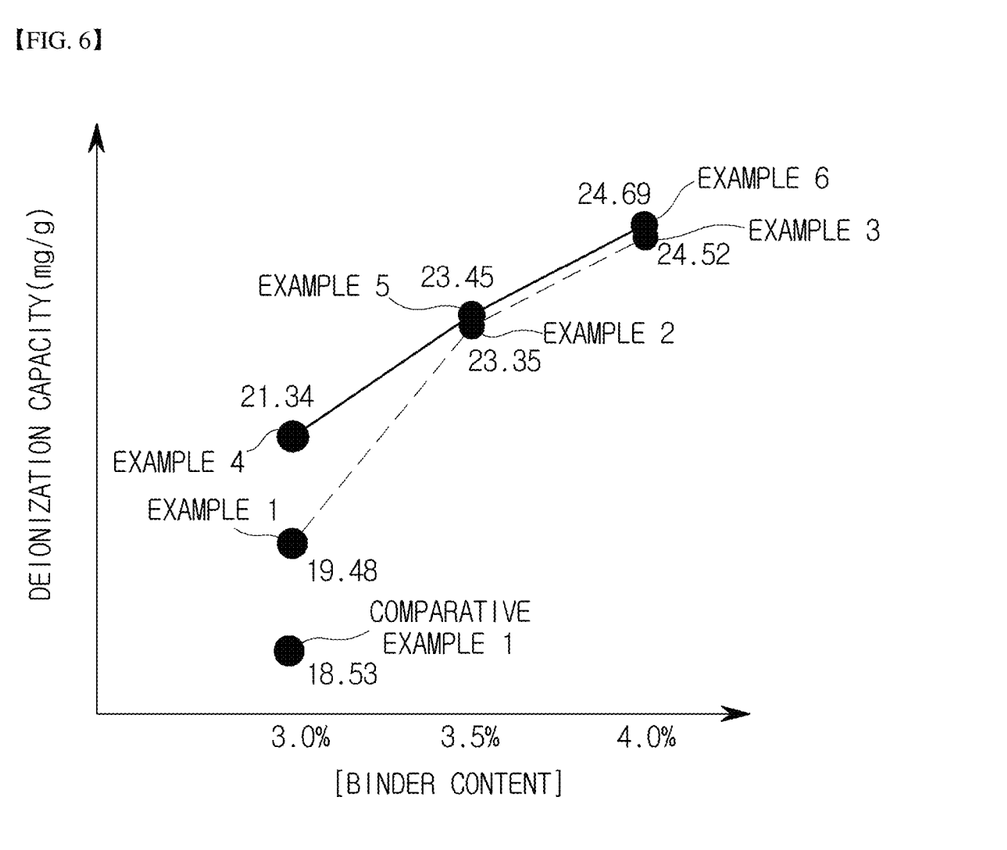
FIG. 6 is a graph showing results of measuring deionization capacity (mg/g) of cells manufactured using electrodes of Examples 1 to 6 and Comparative Example 1 in Experimental Example 1 of the present disclosure.

2000 mg/L of a NaCl solution was supplied while applying electrode potential constantly at 1.5 V. Electrical conductivity of the effluent was measured to analyze deionization efficiency. The operation was performed such that, after adsorbing for 5 minutes, the electrode potential was changed to 0.0 V to desorb for 5 minutes. Deionization capacity (mg/g) was measured as a result of progressing a deionization experiment using the manufactured cells, and the results are shown in FIG. 6. Changes in the electrical conductivity of the solution were measured while progressing adsorption and desorption in the cells of Example 4 and Comparative Example 1, and the results are shown in FIG. 7.

As shown in FIG. 6, it was seen that, whereas Comparative Example 1 using an active carbon powder having a specific surface area of less than 1900 m$^2$/g as an electrode active material had deionization capacity of just 18.53 mg/g, Examples 1 to 6 using an active carbon powder having a specific surface area of 1900 m$^2$/g or greater as an electrode active material according to the present disclosure all had deionization capacity of 19.48 mg/g or greater, which is very high, and deionization capacity increased by 30% or greater compared to Comparative Example 1 as the binder content increased.

Figure 7:
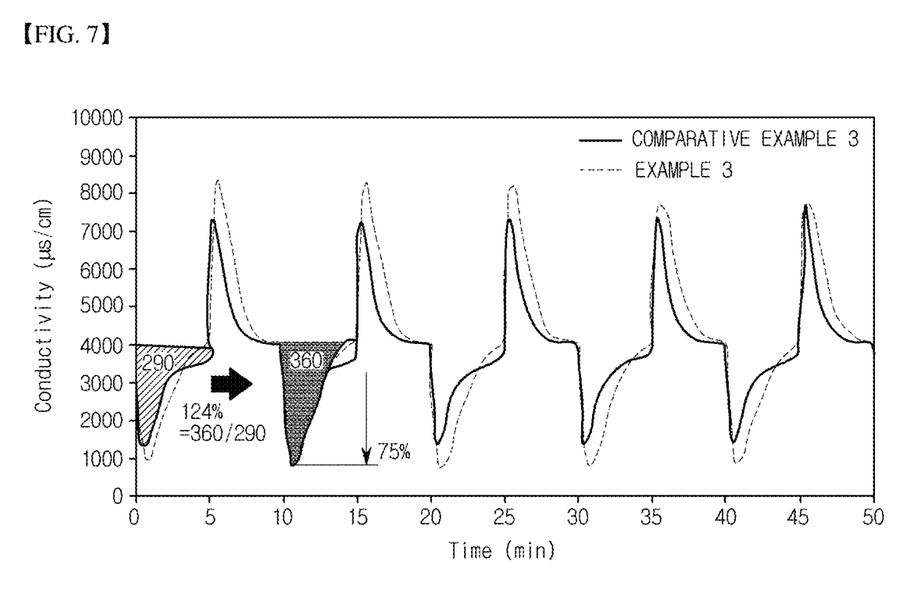
FIG. 7 is a graph showing results of measuring changes in the electrical conductivity of cells manufactured using electrodes of Examples 1 to 6 and Comparative Example 1 in Experimental Example 1 of the present disclosure.

In addition, as shown in FIG. 7, performance of electrical conductivity increased by 124% when using the cell of Example 4 compared to Comparative Example 1, and salt rejection of a maximum of 75% or greater was identified.

Through this, it was seen that the electrode manufactured according to the method of the present disclosure using an active carbon powder having a specific surface area of 1900 m$^2$/g or greater as an electrode active material had very superior deionization efficiency.

Comparative Example 2

Manufacture of Electrode for Capacitive Deionization

An electrode slurry was prepared by mixing an electrode active material, an organic binder, an organic solvent and other additives listed in the following Table 4, and stirring the result. The electrode slurry prepared as above was laminated on a graphite current collector using a tape casting method to manufacture an electrode.

TABLE 4

| Category | Component, Content |
|---|---|
| Active Carbon Material | Preparation Example 2, 10 g |
| Organic Solvent | Toluene + Ethanol, 15 g |
| Organic Binder | Polyvinyl Butyral, 4 g |
| Viscosity Agent | CMC, 0.5 g |
| Conductor | Carbon Black, 0.5 g |

Comparative Example 3

Manufacture of Electrode for Capacitive Deionization

An electrode was manufactured after preparing an electrode slurry using, while using the same composition as in Example 6, a process of adding a solvent, a binder, a viscosity agent, and a conductor without order to an electrode active material and mixing the result, without kneading, and two-step processes of mixing and stirring.

Experimental Example 2

Measurement of Deionization Capacity and Electrode Quality

Figure 8:
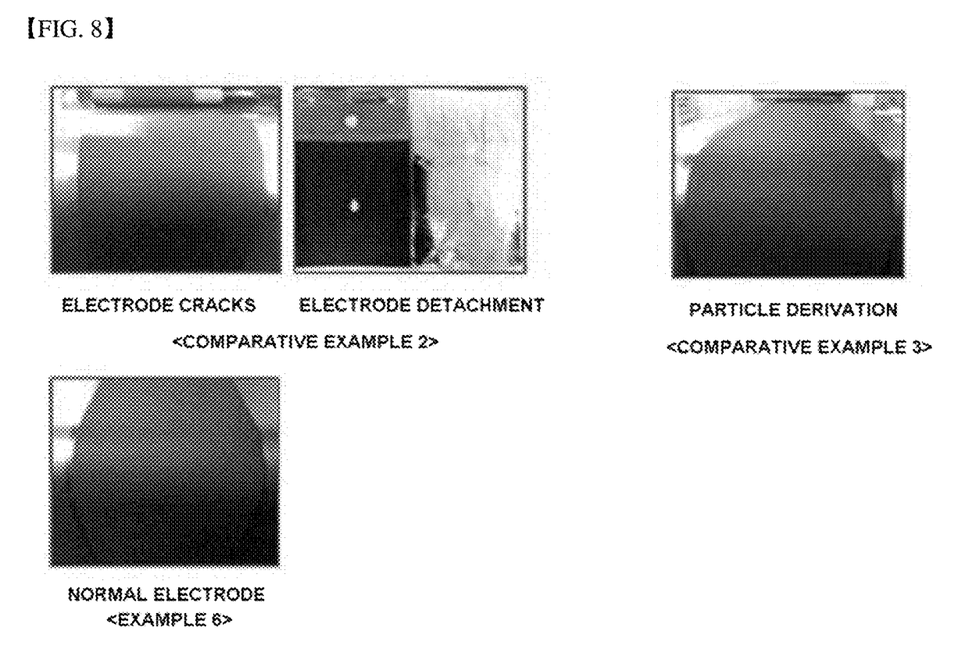
FIG. 8 are photographs of electrode surfaces of Example 6 and of Comparative Examples 2 and 3 in Experimental Example 2 of the present disclosure, respectively.
Figure 9:
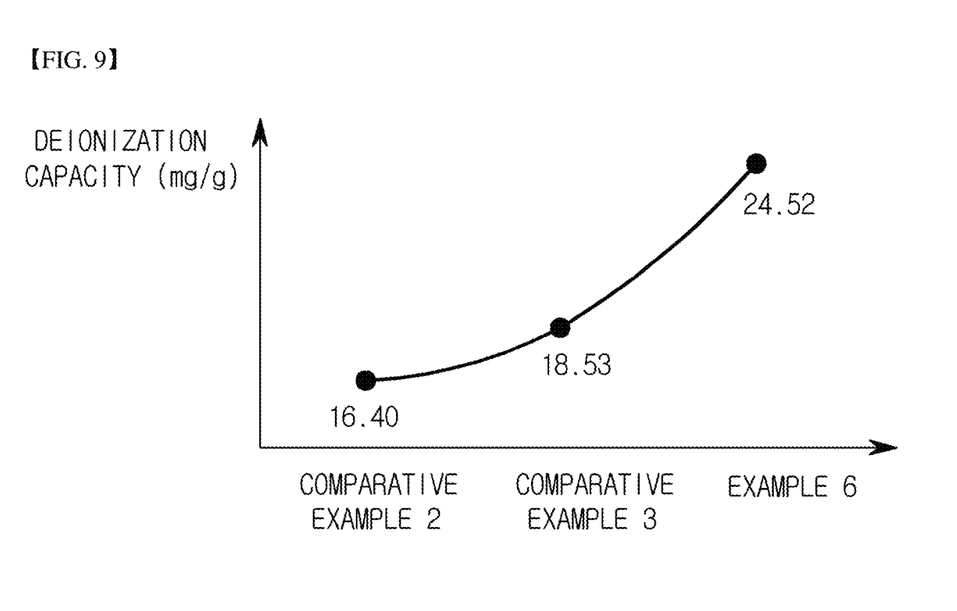
FIG. 9 is a graph showing results of measuring deionization capacity (mg/g) of cells manufactured using electrodes of Example 6, and Comparative Examples 2 and 3 in Experimental Example 2 of the present disclosure.

Pictures of the electrodes manufactured in Example 6, and Comparative Examples 2 and 3 were taken, and the results are shown in FIG. 8, and after manufacturing deionization cells in the same manner as in Experimental Example 1 using the electrodes, deionization capacity was measured, and the results are shown in FIG. 9.

As shown in FIG. 8, a normal uniform electrode surface was formed in the electrode of Example 6. However, cracks occur on the electrode when using the electrode of Comparative Example 2 resulting in electrode detachment, and in the electrode of Comparative Example 3, particle derivation was observed.

In addition, as for deionization capacity as shown in FIG. 9, it was seen that deionization capacity was 24.52 mg/g when using the electrode of Example 6, whereas the electrode of Comparative Example 3 manufactured through batch mixing without kneading, and two-step processes of mixing and stirring as in the present disclosure had deionization capacity of 18.53 mg/g, which is significantly decreased deionization capacity compared to Example 6, and the electrode of Comparative Example 2 manufactured using an organic solvent and an organic binder through existing methods had deionization capacity of just 16.40 mg/g.

Through this, it was seen that the present disclosure is capable of manufacturing an electrode having significantly superior deionization efficiency through kneading, and two-step processes of mixing and stirring.

According to the method for manufacturing a capacitive deionization electrode provided in the present disclosure, a problem of a binder blocking electrode pores, which used to occur when using existing methods, is resolved by increasing mixing efficiency of the binder while using an electrode active material having a high specific surface area, and a capacitive deionization electrode having very superior ionic material adsorption efficiency may be manufactured.

In addition, the present disclosure uses an aqueous binder as the binder and does not use an organic solvent as the solvent when manufacturing the capacitive deionization electrode, and therefore, a problem of an organic solvent being eluted to production water obtained after operating the electrode does not occur.

Hereinbefore, the present disclosure has been described focusing on the examples, however, these are for illustrative purposes only, and it is to be understood that, in the present disclosure, various modifications and other equivalent examples obvious to those skilled in the art may be implemented within the scope of attached claims.

What is claimed is:

1. A method for manufacturing a capacitive deionization electrode, the method comprising:
    (a) kneading an electrode active material while adding a solvent to the electrode active material;
    (b) adding a solvent to the mixture obtained after (a) and stirring the result;
    (c) preparing an electrode slurry by a two-step process of
        (c1) adding a first binder to the mixture obtained after (b) and stirring the result, the first binder including styrene butadiene rubber (SBR) and polyvinylpyrrolidone (PVP); and
        (c2) adding after (c1) a second binder to the mixture including the first binder and stirring the result, the second binder consisting of polytetrafluoroethylene (PTFE); and
    (d) laminating the electrode slurry on both surfaces of a current collector using tape casting.

2. The method of claim 1, wherein the electrode active material includes one of an active carbon powder, an active carbon fiber, a carbon nanotube, a carbon aerogel, and a mixture thereof.

3. The method of claim 1, wherein the electrode active material has a specific surface area of at least 1900 $m^2/g$.

4. The method of claim 1, wherein the electrode active material has an average particle diameter of not more than 10 μm.

5. The method of claim 1, wherein the electrode active material is included in an amount of 20% by weight to 40% by weight with respect to a total weight of the electrode slurry.

6. The method of claim 1, wherein the solvent of (a) includes an aqueous solvent.

7. The method of claim 1, wherein the solvent of (a) is added in an amount of 10% by weight to 15% by weight with respect to a total weight of the electrode slurry.

8. The method of claim 1, wherein the solvent of (a) is added to the electrode active material in divided portions of 2 to 20 times.

9. The method of claim 1, wherein the kneading is carried out for 20 minutes to 6 hours.

10. The method of claim 1, wherein the solvent of (b) is added in an amount of 30% by weight to 45% by weight with respect to a total weight of the electrode slurry.

11. The method of claim 1, wherein:
    (b) includes (b1) adding one or more types of additives selected from the group consisting of a conductor, a dispersant, and a viscosity agent,
    the conductor is selected from the group consisting of graphene, acetylene black, ketjen black, XCF carbon, SRF carbon, conducting polymer powders, and inorganic salts,
    the dispersant is selected from the group consisting of triethanolamine oleate, sodium oleate, potassium oleate, N-cetyl-N-ethylmorpholinium sulphate, oleic acid, sorbitan trioleate, and sorbitan monolaurate, and
    the viscosity agent is selected from the group consisting of polyvinyl alcohol, polyacrylate, hydroxypropyl methyl cellulose and carboxymethyl cellulose.

12. The method of claim 11, wherein the one or more types of additives are added in an amount of greater than 0% by weight and less than or equal to 10% by weight with respect to a total weight of the electrode slurry.

13. The method of claim 1, wherein each of the first and second binders includes an aqueous binder.

14. The method of claim 1, wherein the first binder consists of the styrene butadiene rubber (SBR) and the polyvinylpyrrolidone (PVP).

15. The method of claim 1,
    wherein (d) comprises manufacturing an electrode by laminating the electrode slurry obtained in (c) on the current collector, and
    wherein the current collector has a form of a sheet, a thin film or a plain woven wire mesh including aluminum, nickel, copper, titanium, iron, stainless steel, graphite or mixtures thereof.

* * * * *